United States Patent [19]

Hordis et al.

[11] Patent Number: 5,601,049

[45] Date of Patent: Feb. 11, 1997

[54] BOAT HULL

[75] Inventors: Robert C. Hordis, Moorestown, N.J.;
Robert P. Anderson, Jr., Lecanto, Fla.

[73] Assignee: Spraycore Composites, Inc., Wildwood, Fla.

[21] Appl. No.: 479,325

[22] Filed: Jun. 7, 1995

[51] Int. Cl.$^6$ .................................................. B63B 5/24
[52] U.S. Cl. ........................................ 114/357; 264/258
[58] Field of Search ....................... 114/355, 357; 264/258, 338, DIG. 6; 428/286, 287, 283, 325, 328, 331, 332; 427/421, 264

[56] References Cited

U.S. PATENT DOCUMENTS

| | | | |
|---|---|---|---|
| 3,271,222 | 9/1966 | Moorman | 114/355 |
| 3,923,951 | 12/1975 | Pukszta, Jr. | 264/258 |
| 4,065,820 | 1/1978 | Starret, Jr. | 114/357 |
| 4,099,280 | 7/1978 | Hoppe et al. | 114/357 |
| 5,036,788 | 8/1991 | Unger | 114/355 |

OTHER PUBLICATIONS

P. 97 of the Mar. 1987 Popular Mechanics Mar. 1987.

*Primary Examiner*—Edwin L. Swinehart
*Attorney, Agent, or Firm*—John F. A. Earley; John F. A. Earley, III

[57] ABSTRACT

A method of protecting a plastic boat hull against blistering, comprising the steps of applying an outer gelcoat layer to the inner surface of a mold, applying a layer of barrier coat material of microspheres thoroughly mixed in a synthetic resin matrix to the outer gelcoat layer to form a barrier coat layer, bonding the barrier coat layer to the outer gelcoat layer, applying an outer layer of fiber reinforced synthetic plastic to the barrier coat layer, bonding the outer fiber reinforced synthetic plastic layer to the barrier coat layer, applying successive layers of fiber reinforced synthetic plastic to form a laminated boat hull having a series of fiber reinforced synthetic plastic layers with an inner layer, and applying an inner gelcoat layer to the inner layer of the fiber-reinforced synthetic plastic layers.

A boat hull which is protected against blistering on the underwater surface comprises successive layers of fiber reinforced synthetic plastic having an outer layer having water soluble materials incorporated therein, a barrier coat layer of a barrier coat material of microspheres thoroughly mixed in a synthetic resin matrix bonded to the outer layer to form a barrier coat layer, said barrier coat layer having an outer surface, the microspheres being impermeable to water, and a gelcoat layer bonded to the outer surface of the barrier coat layer, the microspheres having passageways between them which increase the length of passage of water to water soluble materials in the layers of fiber reinforced plastic.

20 Claims, 2 Drawing Sheets

BOAT HULL

BACKGROUND OF THE INVENTION

1. Field of the Invention

This invention relates to boat hulls, and more particularly concerns boat hulls made of laminated fiber reinforced plastic and with providing protection against blistering on the underwater surface of the boat hull.

2. Description of the Prior Art

Since the time when fiber reinforced plastic took over from wood as the major material used in the construction of boat hulls for pleasure marine craft, and many of the smaller work boats as well, the formation of blisters on the underwater hull surface has plagued designers, builders, and owners.

All synthetic resin plastic materials of boat hulls have a water vapor transmission rate when the lower or bottom surface is submerged in water while the upper surface of the hull is exposed to air. In a floating boat hull, the fiber reinforced plastic hull section of laminated layers below the water line of the boat gradually takes on a certain amount of water by osmosis.

The fiber reinforced plastic laminates of boat hulls contain certain amounts of water soluble molecules, some more than others. The chemical reaction which occurs when water soluble molecules of the hull have absorbed enough of the osmatic water may, in some instances, cause a sufficient localized parting of the hull laminated layers to form a blister on the outer surface of the hull.

If this blistering is sufficiently widespread on the underwater surface of the hull, it can seriously affect the performance of the boat. Left untreated, such blistered boat hulls continue to deteriorate, possibly even to the extent of creating a structurally unsound condition, so that the boat hull is not strong enough to be adequately covered by the designer's built-in safety factors.

As this problem became generally known to boat hull designers and builders, preventative measures were sought and tried. It became known that the most common plastic resin used in the plastic in fiber reinforced plastic boat hull construction was not the most resistant to moisture vapor transmission. However, many of its other properties continued to make it the most appealing product to the builders, and it is still the most widely used resin today in fiber reinforced plastic boat hull construction.

Listed below in the order of greatest resistance to moisture vapor transmission, are:

1. Epoxy
2. Vinyl ester
3. Isophthalic polyester resin
4. DCPD polyester
5. Orthophthalic polyester This listing, in reverse order, closely approximates the rating of the resin as regards total pounds of usage in the marine industry. Many laminated resins sold to boat builders by the resin producing industry are blends of two or more of the above resins.

Epoxy resins are difficult to use in the average boat hull production shop, being less tolerant of deviation from recommended procedures. Also, epoxy resins are considerably more expensive than the polyesters. The usage of epoxy resins is largely confined to high-tech specialty vessels using more exotic fabrics than the standard fiberglass and to parts requiring maximum strength with minimum weight. Epoxy resins are also used extensively in repairing damage to boat hulls and other parts of marine vessels.

Vinyl esters are used by many of the large boat manufacturers in combination with fiberglass as the bottom fiberglass-resin layer of the boat hull, next to the exterior finish coat which is known as a gelcoat, which gelcoat is usually a combination of an isophthalic polyester resin with pigment of a desired color. But vinyl esters are also demanding of a proper application technique. Vinyl esters are also considerably more expensive than various polyesters.

Isophthalic polyester resins are presently the preferred resin of choice for the outer gelcoat layer, as they produce a hard glossy surface which is desired for best cosmetics. They are not widely used otherwise, other than in combination with DCPD and orthophthalic polyester resin.

DCPD polyesters have come into common use in recent years, primarily by manufacturers of smaller boats. They give a good cosmetic appearance, and are easy to use, but are less flexible than the other resins. They normally are used in blends with orthophthalic and/or isophthalic resins, which are proprietary to the individual resin manufacturer. They usually are the least costly of all the marine resins.

Orthophthalic polyester resins have long been the choice for most manufactures in the marine field due to their user friendliness coupled with their low cost, good strength characteristics, and longer in-use history.

Builders have approached the hull bottom osmosis or blister problem in different ways:

1. By using a specifically formulated outer gelcoat with a lower moisture vapor transmission rate than the standard isophthalic resin based outer gelcoat;
2. Using a low moisture vapor transmission rate resin in the outer layer or layers of the laminate inside the gelcoat, normally a vinyl ester or a vinyl ester blend;
3. Total use of high performance resin, as regards to moisture vapor transmission rate, in the laminate below the designed water line of the hull.

While all of the above approaches may improve the resistance to hull blistering, none provides as significant improvement as does the present invention.

When a special gelcoat is used as the only agent for preventing blisters, it provides only a thin primary barrier, subject to cracks since it is more brittle than the other layers of the boat hull.

Even when using a resin, with a low moisture vapor transmission rate, in combination with fiberglass fibers, in all of the layers of the laminate, or in only the outer few layers, all of the layers of the laminate contain strands of glass fibers which can increase the moisture vapor transmission by a wicking action as well as contributing water soluble molecules to any water which penetrates the outer gelcoat.

In addition, the laminate lay-up process involves a hand rolling of the various layers, and it is not uncommon to have trapped air pockets occur directly behind the gelcoat which eventually become water reservoirs to react with the water soluble molecules in the laminate layers.

Reference is made to the following prior art patents which are incorporated herein by reference: U.S. Pat. No. 5,126,172 which issued on Jun. 30, 1992 on an application filed Nov. 20, 1990; U.S. Pat. No. 5,292,580 which issued on Mar. 8, 1994 which was filed on Jun. 30, 1992 and is a division of Ser. No. 616,239, filed Nov. 20, 1990, now U.S. Pat. No. 5,126,172; U.S. Pat. No. 5,277,145 which issued on Jan. 11, 1994 on an application filed Sep. 23, 1992, which is a continuation of Ser. No. 550,859, filed Jul. 10, 1990, abandoned; and U.S. Pat. No. 5,372,763 which issued on Dec. 13, 1994 on an application filed Jun. 30, 1993, which is a division of Ser. No. 950,968, filed Sep. 23, 1992, now U.S. Pat. No. 5,277,145.

SUMMARY OF THE INVENTION

The present invention is an improvement over all of the blister prevention methods previously mentioned.

The present invention includes a barrier coat which is a superior barrier to moisture vapor transmission. This barrier coat is applied directly behind the outer gelcoat layer of a vessel hull being constructed of layers of fiber reinforced plastic.

With fiber reinforced vessel hulls that have already been constructed, the barrier coat may be applied to the exterior surface of the vessel as an initial barrier to moisture vapor transmission, and may be applied before the vessel is placed into service in the water, or at a later date as part of a procedure to prevent further blistering in hulls which have already blistered, or simply to forestall possible future blistering. In such cases, another, or second, outer gelcoat may be applied to the barrier coat.

In the barrier coat, microspheres of hollow or solid glass or ceramic are encapsulated in a resin matrix, which matrix may be any of the commonly used resins in marine applications, or any other resin found to be suitable for use by virtue of compatibility with the gelcoat resin and the laminating layer resin of the outer fiber-reinforced plastic layer.

The ratio of spheres to resin by volume is as high as possible, bearing in mind the need to maintain bonding ability of the microspheres to both the gelcoat layer and to the outer fiber reinforced plastic laminate layer.

The barrier coat material must be thoroughly blended to give an even distribution of the microspheres throughout the matrix, producing a basically homogenous mass.

Application of the barrier coat layer is preferably by the spray method as this is the least labor intensive means to achieve a relatively uniform thickness of the barrier coat layer. To achieve proper bonding to the outer gelcoat layer, the barrier coat layer should be applied before the final chemical cure of the outer gelcoat has occurred. Similarly, the succeeding layer of fiber reinforced plastic should be applied to the barrier coat layer before the chemical cure of the barrier coat layer has been completed.

The present invention improves on other means of reducing hull blister promulgation by using microspheres which have virtually no moisture vapor transmission or absorption and which for practical purposes may be considered to be solid, non-absorbent material although solid microspheres may also be used. Hollow microspheres are the preferred form of microspheres as they provide a barrier coat layer that is lighter in weight.

It is an object of this invention to provide a method for significantly reducing the possibility of hull blistering of newly constructed fiber reinforced plastic boat hulls by providing a superior barrier coat which is a barrier to moisture vapor transmission.

It is another object to provide a superior barrier coat for hulls which have already suffered blistering in order to inhibit the spread of or prevent the reoccurrence of the blistering.

It has been found that a ratio by volume of microspheres to resin of over 50% microspheres may be satisfactorily manufactured and applied in the making of a boat hull.

As the microspheres are uniformly dispersed through out the barrier coat material, due to the spherical shape of the microspheres the open passages between the microspheres in a 50/50 blend with resin are restricted to about 24% of the surface area, thereby reducing the available water permeable surface area by 76%. Thus, for any given thickness of barrier coat material applied, the moisture vapor transmission is 76% less than that through a solid thickness of the resin without the microspheres.

As the microspheres reduce the volume of resin required in any given thickness of barrier coating by about 50%, use of resins with low moisture vapor transmission rates but higher costs become practical for even the most cost conscience builder.

Presently, maximum effectiveness has found to be achieved by using a blend by volume of 52% glass microspheres as supplied by 3M, and 48% by volume of epoxy/ vinyl ester resin as supplied by Interplastics Corporation. This combination of materials also provides excellent resistance to the print-through into the gelcoat, of woven materials used in subsequent laminate layers, also a longtime problem to boat manufacturers. The microspheres may be SCOTCHLITE glass bubbles as sold by 3M, St. Paul, Minn. SCOTCHLITE glass bubbles have as an ingredient soda lime borosilicate glass (amorphous silicate) and a preferred bubble type may be B37/2000.

The microspheres may also be also be sold under the trademark Q-CEL by the Specialty Chemicals Division of PQ corp., Valley Forge, Pa. Q-CEL microspheres range in particle size from 10 to 200 microns, and in displacement density from 0.16 to 0.46 grams per cubic centimeter.

Application of the layers of the boat hull by airless spray provides air-free layers that are free of air pockets which could form reservoirs for water vapors or for water which permeates the outer gelcoat layer.

DETAILED DESCRIPTION OF THE DRAWINGS

Figure 1:
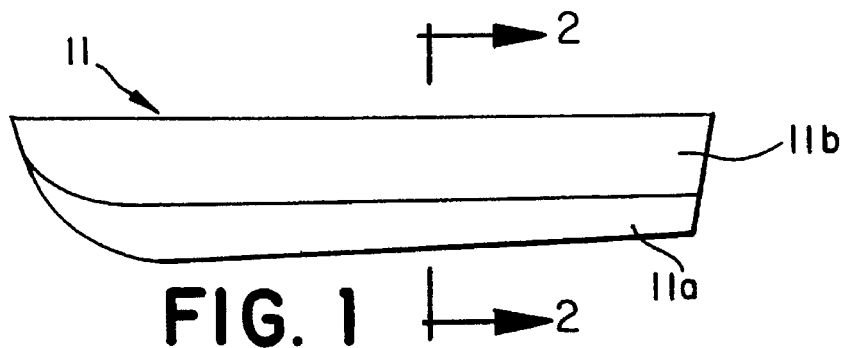
FIG. 1 is a view in side elevation of a boat hull constructed in accordance with this invention.
Figure 2:
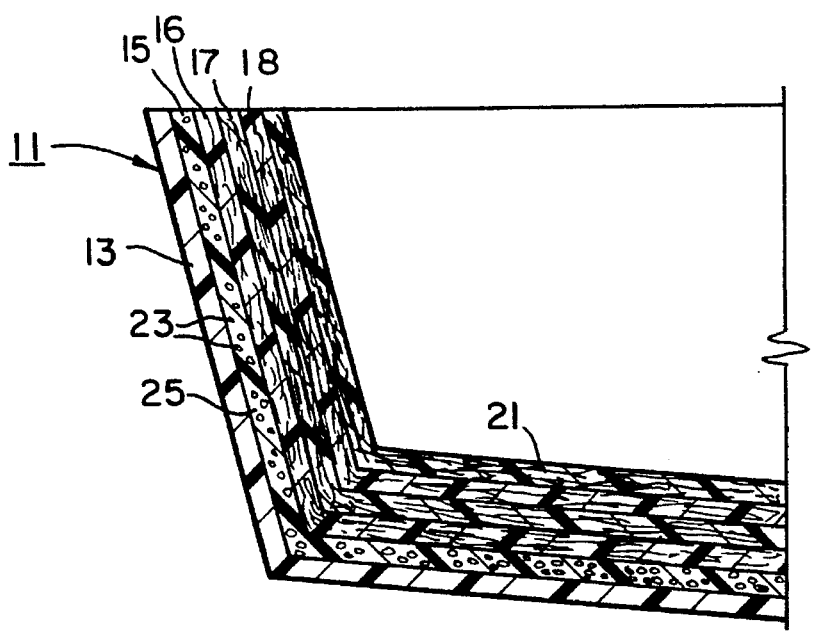
FIG. 2 is a view in cross section of the boat hull of FIG. 1 taken as indicated by the lines and arrows 2—2 which appear in FIG. 1.

Turning now to the drawings, there is shown a boat hull 11 which is a laminated boat hull and which comprises an outer gelcoat layer 13, a barrier coat layer 15, an outer layer 16 of fiber reinforced plastic, a number of fiber reinforced plastic layers of which only a few 17, 18 are shown, and an inner gelcoat layer 21. The barrier coat material of barrier coat 15 comprises a number of microspheres 23 which are thoroughly mixed in a synthetic resin matrix 25.

The barrier coat layer 15 is bonded to the outer fiber reinforced plastic layer 16, and is also bonded to the outer gelcoat layer 13.

Figure 4:
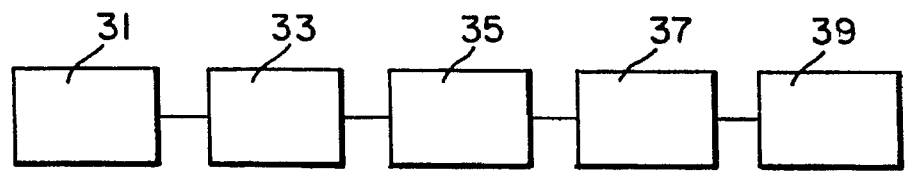
FIG. 4 is a flow chart having boxes which set forth the claimed method steps of the invention.

The method of building the laminated fiber reinforced plastic boat hull 11 which has an underwater outer surface 11a and an above water outer surface 11b, and of protecting the boat hull 11 against blistering on its underwater outer surface 11a comprises the steps referring to the flow chart of FIG. 4, of box 31, applying gelcoat layer 13 to the inner surface of a mold 32, applying, box 35, the barrier coat layer 15 to the outer gelcoat layer 13, applying, box 35, a fiber reinforced outer layer 16 to the barrier coat layer 15, applying, box 37, another fiber reinforced plastic layer 17 to the outer fiber reinforced resin layer 16, applying another fiber reinforced plastic layer 18 to the fiber reinforced plastic layer 17, and so on with successive fiber reinforced plastic layers, and then applying an inner gelcoat layer 21 to the inner fiber reinforced plastic layer.

The barrier coat layer 15 is applied to the outer gelcoat layer 13 before the final chemical cure of the outer gelcoat layer 13, and the outer fiber reinforced plastic layer 16 is applied to the barrier coat layer 15 before the final cure of the barrier coat layer 15.

Figure 3:
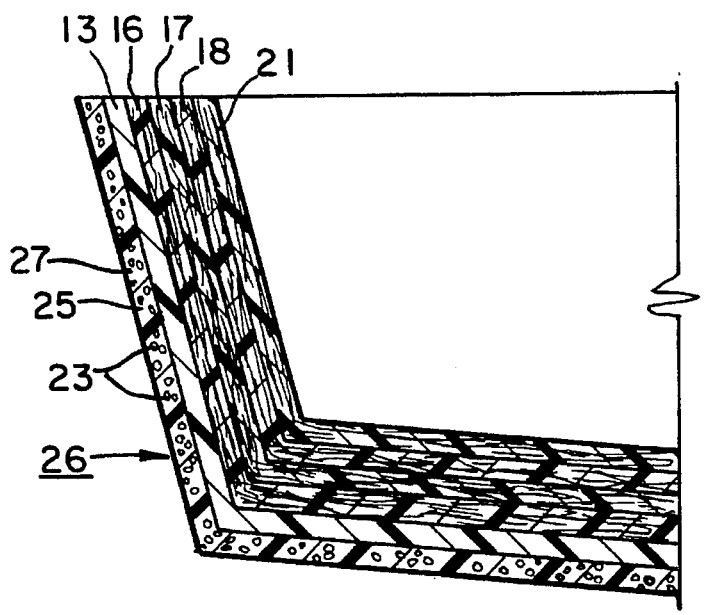
FIG. 3 is a view in cross section of a boat hull which is another embodiment of this invention and shows a boat hull which has been modified by adding a barrier coat.
Figure 2A:
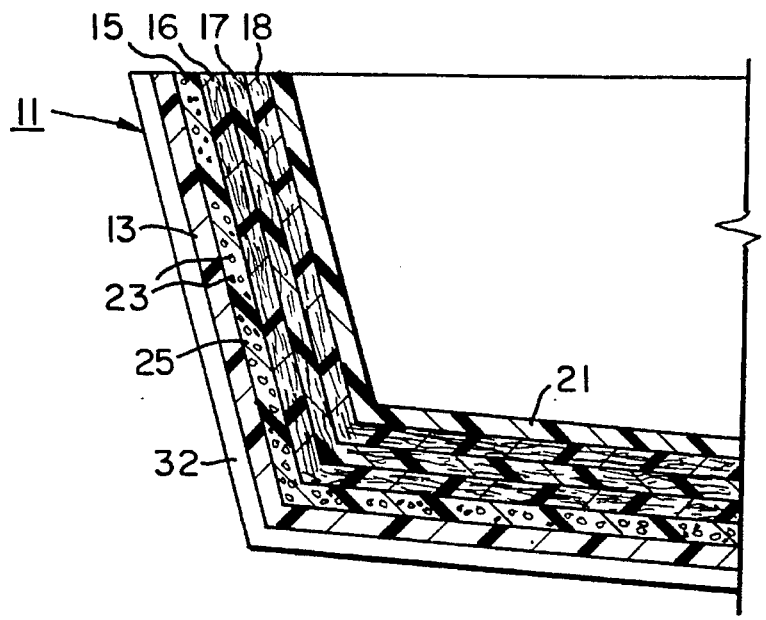
FIG. 2A is a view in cross section of a boat hull similar to the boat hull shown in FIG. 2 but with an outer gelcoat layer and an inner gelcoat layer.
Figure 3A:
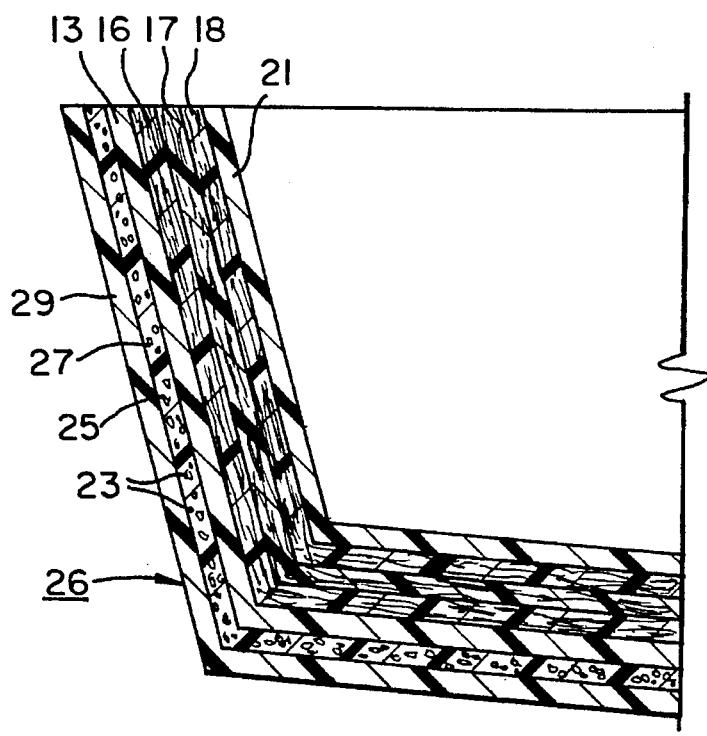
FIG. 3A is a view in cross section of another embodiment of this invention and shows a boat hull similar to the boat hull of FIG. 3, but which has an outer and an inner gelcoat layer.

The laminated fiber reinforced plastic boat hull 26 of FIG. 3 has been modified in accordance with this invention by applying a barrier coat layer 27 to the outer gelcoat layer 13 of a boat hull having fiber reinforced resin layers 16, 17, 18 and inner gelcoat layer 21, and then applying an outer or second gelcoat layer 29 to the barrier coat layer 27.

The outer gelcoat layer 29 is applied to the barrier coat layer 27 before the final chemical cure of the barrier coat layer 27.

If necessary or desirable, each layer of the Figs. is rolled in order to insure cohesion between the layers and to eliminate any air pockets.

The composition of the barrier coat material of barrier coat layer 15 is illustrated by the following examples:

EXAMPLE 1

The preferred embodiment of barrier coat material is as follows:
Soda lime borosilicate hollow microspheres 52%
Epoxy/vinylester resin 48%

EXAMPLE 2

Ceramic hollow microspheres 52%
Epoxy/vinylester resin 48%

EXAMPLE 3

Soda lime borosilicate glass hollow microspheres 60%
Vinylester resin 40%

EXAMPLE 4

Soda lime borosilicate glass hollow microspheres 40%
Vinylester resin 60%

In the above Examples 3 and 4, hollow microspheres of ceramic material may be substituted for the hollow microspheres of soda lime borosilicate glass, and substitutions may be made for the vinylester resin. The resin substitutes include epoxy resin, epoxy/vinylester resin, isophthalic polyester resin, and orthophthalic polyester resin.

We claim:
1. In building a laminated fiber reinforced plastic boat hull having an underwater outer surface and an above water outer surface,
 a method of modifying the boat hull such that it is resistant against blistering, comprising
 applying an outer gelcoat layer to the inner surface of a boat hull mold,
 applying a layer of barrier coat material of microspheres thoroughly mixed in a synthetic resin matrix to the outer gelcoat layer to form a barrier coat layer against water vapor transmission,
 bonding the barrier coat layer to the outer gelcoat layer,
 applying an outer layer of fiber reinforced synthetic plastic to the barrier coat layer,
 bonding the outer fiber reinforced synthetic plastic layer to the barrier coat layer, and
 applying successive layers of fiber reinforced synthetic plastic to form a laminated boat hull having a series of fiber reinforced synthetic plastic layers which are protected against water transmission by the barrier layer.
2. The method of claim 1, wherein said microspheres are hollow.
3. The method of claim 1, wherein said microspheres are solid.
4. The method of claim 1, wherein said microspheres are glass.
5. The method of claim 1, wherein said microspheres are a ceramic material.
6. The method of claim 1, wherein said synthetic resin matrix is a vinylester or epoxy/vinylester resin.
7. The method of claim 1, including applying the barrier coat layer to the outer gelcoat layer before the final chemical cure of the gelcoat layer.
8. The method of claim 1, including applying the outer fiber-reinforced resin layer to the barrier coat layer before the final chemical cure of the barrier coat layer.
9. The method of claim 1,
 said microspheres being spherical in shape,
 increasing the effective length of travel of water vapor to the capsulating synthetic resin matrix by approximately seventy-six percent when the microspheres comprise fifty percent by volume of the barrier coat material,
 said barrier coat material containing minimal water soluble molecules,
 said increase in length of travel for water vapor to reach water soluble molecules present in the reinforced plastic layers behind the barrier coat effectively increasing the time of protection by seventy-six percent over that of a barrier coat layer of the same thickness comprised solely of synthetic resin matrix.
10. A boat hull, which is protected against blistering on the underwater surface of the boat hull, made in accordance with the method of claim 1.
11. A boat hull which is protected against blistering on the underwater surface of the boat hull made in accordance with the method of claim 1.
12. In building a laminated fiber reinforced plastic boat hull having an underwater outer surface and an above water outer surface,
 a method of modifying the hull such that it is resistant against blistering, comprising
 applying an outer gelcoat layer to the inner surface of a boat hull mold,
 applying a layer of barrier coat material of microspheres thoroughly mixed in a synthetic resin matrix to the outer gelcoat layer to form a barrier coat layer which is a barrier to water vapor transmission, bonding the barrier coat layer to the outer gelcoat layer, applying an outer layer of fiber reinforced synthetic plastic to the barrier coat layer, bonding the outer layer of fiber reinforced synthetic plastic to the barrier coat layer, applying successive layers of fiber reinforced synthetic plastic to form a laminated boat hull having a series of fiber reinforced synthetic plastic layers with an inner layer, and applying an inner gelcoat layer to the inner layer of the fiber-reinforced synthetic plastic layers, said microspheres being hollow, said microspheres being glass, said synthetic resin matrix being a synthetic resin, said microspheres being impermeable to water, the microspheres having passageways between them with length of the passageways between microspheres lengthening the length of the passage of water through the barrier layer to any water soluble materials in the layers of the fiber reinforced plastic.

13. In a method of modifying and protecting a boat hull against blistering on the underwater surface of the boat hull, said boat hull having an outer gelcoat layer, the method comprising applying a layer of barrier coat material to the outer gelcoat layer to form a barrier coat layer, said barrier coat material comprising microspheres thoroughly mixed in a synthetic resin matrix, bonding the barrier coat layer to the outer gelcoat layer, applying a second gelcoat layer to the outer surface of the barrier coat layer, and bonding the second gelcoat layer to the barrier coat layer.

14. A boat hull which is protected against blistering on the underwater surface of the boat hull, comprising successive layers of fiber reinforced synthetic plastic having an outer layer having water soluble materials incorporated therein, a barrier coat layer of a barrier coat material bonded to the outer layer to form a barrier coat layer, said barrier coat layer having an outer surface, said barrier coat material comprising microspheres thoroughly mixed in a synthetic resin matrix, said microspheres being impermeable to water, and a gelcoat layer bonded to the outer surface of the barrier coat layer, said microspheres having passageways between them which increase the length of the passage of any water to any water soluble materials in the layers of fiber reinforced plastic.

15. The boat hull of claim 14, wherein said microspheres are hollow.

16. The boat hull of claim 14, wherein said microspheres are solid.

17. The boat hull of claim 14, wherein said microspheres are glass.

18. The boat hull of claim 14, wherein the microspheres are of a ceramic material.

19. The boat hull of claim 14, wherein the synthetic resin matrix is a synthetic resin.

20. The boat hull of claim 14, said microspheres being hollow, said microspheres being glass, said synthetic resin matrix being a synthetic resin, and said microspheres being impermeable to water.

* * * * *